US008887692B2

(12) United States Patent
Baur et al.

(10) Patent No.: US 8,887,692 B2
(45) Date of Patent: Nov. 18, 2014

(54) SYSTEMS AND METHODS FOR DECREASING TORQUE FLUCTUATIONS DURING CYLINDER DEACTIVATION AND REACTIVATION

(75) Inventors: Andrew W. Baur, Whitmore Lake, MI (US); Sean Slade, Detroit, MI (US)

(73) Assignee: GM Global Technology Operations LLC

( * ) Notice: Subject to any disclaimer, the term of this patent is extended or adjusted under 35 U.S.C. 154(b) by 877 days.

(21) Appl. No.: 13/026,603

(22) Filed: Feb. 14, 2011

(65) Prior Publication Data
US 2012/0204832 A1 Aug. 16, 2012

(51) Int. Cl.
*F02P 5/00* (2006.01)
*F02D 17/02* (2006.01)
*F02D 13/02* (2006.01)
*F02P 5/15* (2006.01)
*F02D 23/00* (2006.01)
*F02D 13/06* (2006.01)
*F02D 41/00* (2006.01)
*F02M 25/07* (2006.01)

(52) U.S. Cl.
CPC ............... *F02D 13/06* (2013.01); *Y02T 10/144* (2013.01); *Y02T 10/46* (2013.01); *F02D 13/0219* (2013.01); *F02P 5/1512* (2013.01); *Y02T 10/18* (2013.01); *F02D 23/00* (2013.01); *F02M 25/0707* (2013.01); *F02D 41/0087* (2013.01)
USPC .................................... 123/406.19; 123/198 F

(58) Field of Classification Search
CPC ..... F02D 41/0087; F02D 37/02; F02P 5/1512
USPC ............ 123/198 F, 406.19, 406.23, 481, 325, 123/332; 701/112
See application file for complete search history.

(56) References Cited

U.S. PATENT DOCUMENTS

| 5,657,625 | A | * | 8/1997 | Koga et al. | ....................... 60/274 |
| 7,363,915 | B2 | * | 4/2008 | Surnilla et al. | ................. 123/481 |
| 2011/0180037 | A1 | * | 7/2011 | Blom | .......................... 123/406.2 |
| 2013/0317725 | A1 | * | 11/2013 | Brennan | ....................... 701/105 |

* cited by examiner

*Primary Examiner* — Mahmoud Gimie
*Assistant Examiner* — David Hamaoui

(57) ABSTRACT

A control system for an engine includes a first spark control module and a second spark control module. The first spark control module retards spark timing for M of N cylinders of the engine to a first spark timing during a period before deactivating or after reactivating the M cylinders, wherein M is an integer greater than or equal to one, and wherein N is an integer greater than M. The second spark control module advances spark timing for (N-M) active cylinders of the engine to a second desired spark timing during the period before deactivating or after reactivating the M cylinders, wherein the second spark timing is greater than the first spark timing.

20 Claims, 9 Drawing Sheets

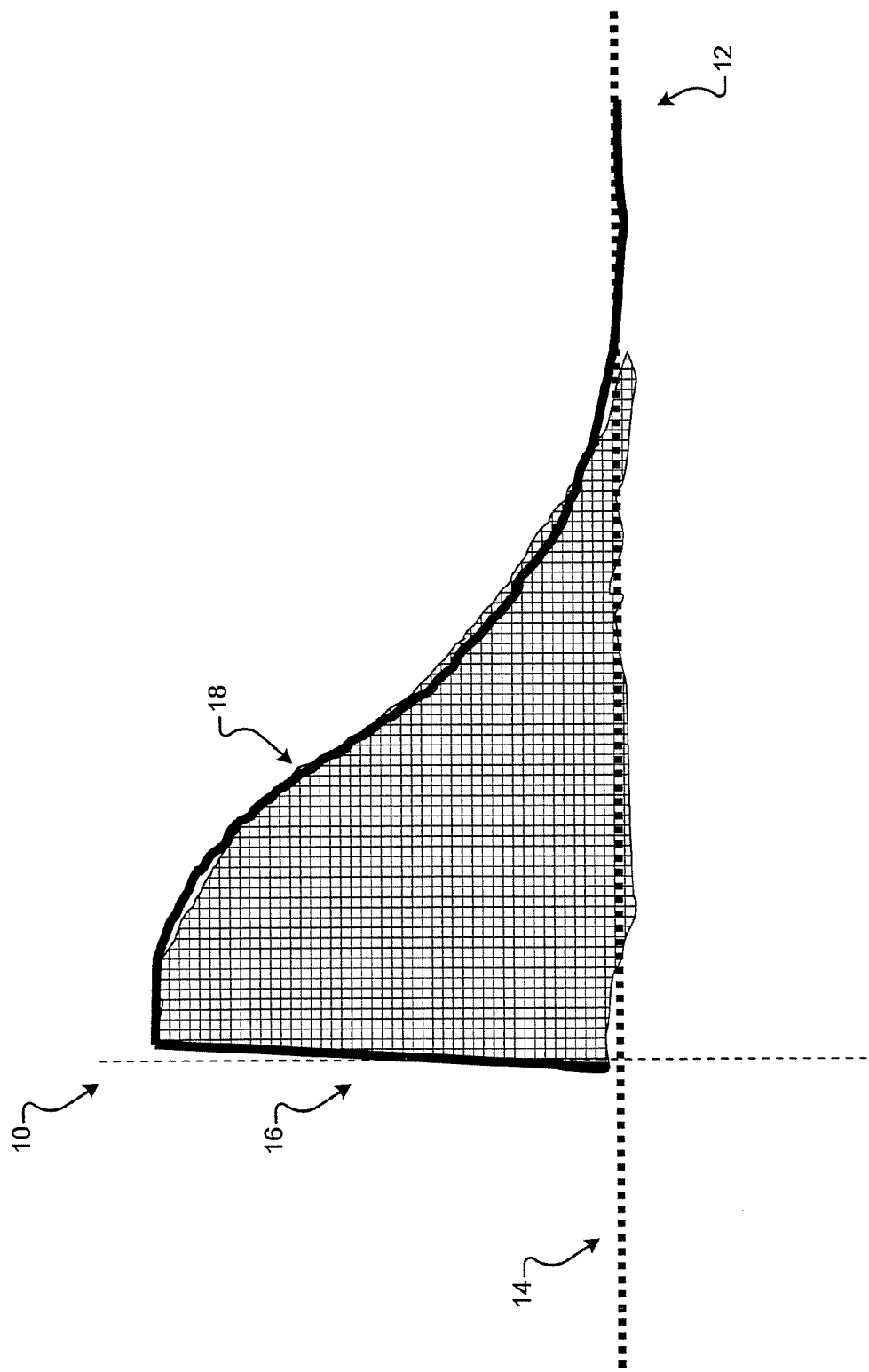

US 8,887,692 B2

SYSTEMS AND METHODS FOR DECREASING TORQUE FLUCTUATIONS DURING CYLINDER DEACTIVATION AND REACTIVATION

FIELD

The present disclosure relates to engine control systems and more particularly to systems and methods for decreasing torque fluctuations during cylinder deactivation and reactivation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A control system for an engine includes a first spark control module and a second spark control module. The first spark control module retards spark timing for M of N cylinders of the engine to a first spark timing during a period before deactivating or after reactivating the M cylinders, wherein M is an integer greater than or equal to one, and wherein N is an integer greater than M. The second spark control module advances spark timing for (N−M) active cylinders of the engine to a second desired spark timing during the period before deactivating or after reactivating the M cylinders, wherein the second spark timing is greater than the first spark timing.

A method for controlling an engine includes retarding spark timing for M of N cylinders of the engine to a first spark timing during a period before deactivating or after reactivating the M cylinders, wherein M is an integer greater than or equal to one, and wherein N is an integer greater than M, and advancing spark timing for (N−M) active cylinders of the engine to a second desired spark timing during the period before deactivating or after reactivating the M cylinders, wherein the second spark timing is greater than the first spark timing.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a graph illustrating torque fluctuation during cylinder reactivation;

DETAILED DESCRIPTION

Figure 1B:
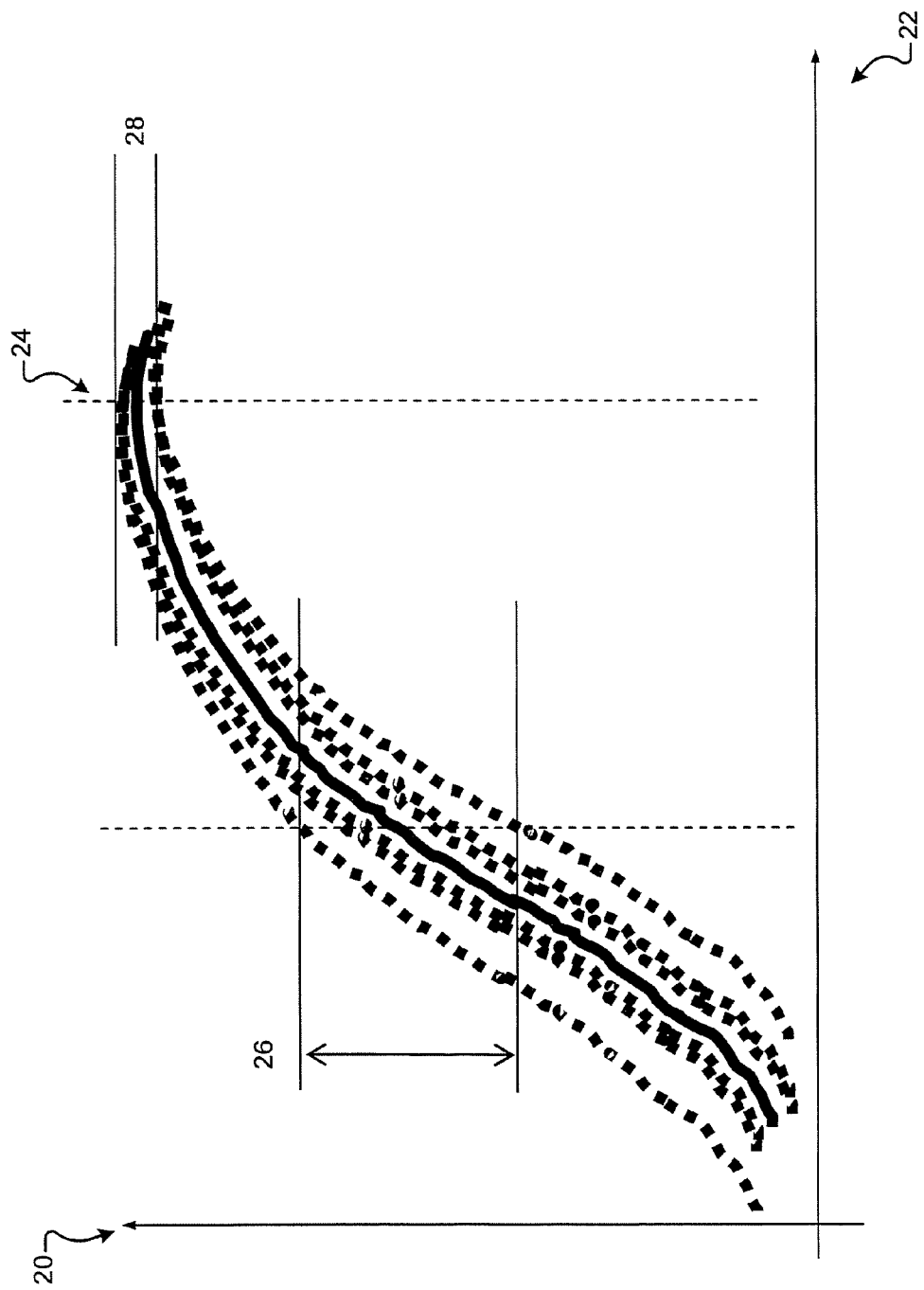
FIG. 1B is a graph illustrating fluctuations in brake torque at various spark timings.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a systemon-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine control system may deactivate one or more cylinders during engine operation to increase fuel economy. For example, the engine control system may deactivate the cylinders during periods when a torque request is less than a predetermined threshold. The deactivated cylinders may then be reactivated when the torque request is greater than the predetermined threshold. The torque request may be based on a change in intake manifold absolute pressure (MAP). The MAP may be used to determine a desired air per cylinder (APC). The desired APC may be used in torque control for each of the cylinders. Controlling the torque produced by each of the cylinders controls axle torque and thereby controls vehicle acceleration.

Cylinder activation and deactivation may occur instantaneously. Changes in the MAP, however, may not. Specifically, the MAP may change slowly during a period after cylinder deactivation or reactivation. The slow change in MAP may cause positive or negative torque fluctuations. For example, FIG. 1A illustrates a positive torque fluctuation during cylinder reactivation. A vertical axis 10 represents axle torque and a horizontal axis 12 represents time. A desired torque output is represented by 14. However, after reactivation at 16, a torque fluctuation 18 occurs.

The torque fluctuations may increase noise/vibration/harshness (NVH) which may cause driver discomfort. An engine control system for an engine having an automatic transmission may control torque converter slip to decrease torque fluctuations. Controlling torque converter slip, however, is both complex and costly. Moreover, an engine having a manual transmission does not have a torque converter. An engine control system for an engine having a manual transmission, therefore, may control all cylinders to a same torque level during cylinder deactivation and reactivation. Controlling all cylinders to the same torque level, however, may decrease fuel economy. Alternatively, the engine control system may increase throttle position (i.e., blip the throttle) before cylinder deactivation. Increasing throttle position before cylinder deactivation, however, may require precise control and thus complex calibrations.

Accordingly, a system and method for decreasing torque fluctuations during cylinder deactivation and reactivation is presented. The system and method may control spark timing during cylinder deactivation and reactivation events to decrease torque fluctuations. Specifically, the system or method may be implemented in an engine control system for an engine that is coupled to a manual transmission. The system and method may retard spark timing for M of N cylinders of an engine ($M \geq 1$, $N > M$) to a first spark timing during a period before deactivating or after reactivating the M cylinders. During the period before deactivating or after reactivating the M cylinders, the system and method may advance spark timing for (N−M) active cylinders of the engine (i.e., a remainder of the N cylinders of the engine) to a second spark timing.

Specifically, the system and method may determine a torque split for both the M deactivating or reactivating cylinders and the (N−M) active cylinders based on a base torque request and a plurality of operating parameters. The torque split represents a value for adjusting the torque generated by each of (i) deactivated/reactivated cylinders and (i) active cylinders while maintaining a same average output torque with less torque disturbances. For example, the base torque request may be based on driver input and the plurality of operating parameters may include minimum and maximum torque capacities at minimum and maximum allowed spark advance for current operating conditions, respectively. The torque split may be a lesser of (1) a product of (i) a difference between the base torque request and the minimum torque capacity and (ii) a quotient of M and (N−M) and (2) a difference between the maximum torque capacity and the base torque request.

The system and method may determine a first torque request for the M deactivating or reactivating cylinders of the engine based on a difference between the base torque request and a product of (i) the torque split and (ii) a quotient of (N−M) and (M). The system and method may then determine the first spark timing based on the first torque request. Similarly, the system and method may determine a second torque request for the (N−M) active cylinders of the engine based on a sum of the base torque request and the torque split. The system and method may then determine the second spark timing based on the second torque request.

For example, FIG. 1B illustrates the decreased torque variations when advancing spark timing of active cylinders to or near to MBT spark timing. A vertical axis 20 represents brake torque and a horizontal axis 22 represents spark timing. As shown, when spark timing advances towards MBT 24, the magnitude of the torque disturbances decrease from a large disturbance 26 to a minimal disturbance 28. In some implementations, M may equal the total number of cylinders in the engine and N may equal half of M. For example, the engine may include eight cylinders (M=8) and four cylinders may be deactivated/reactivated (N=4). However, other numbers of cylinders may be deactivated and/or reactivated.

Figure 2:
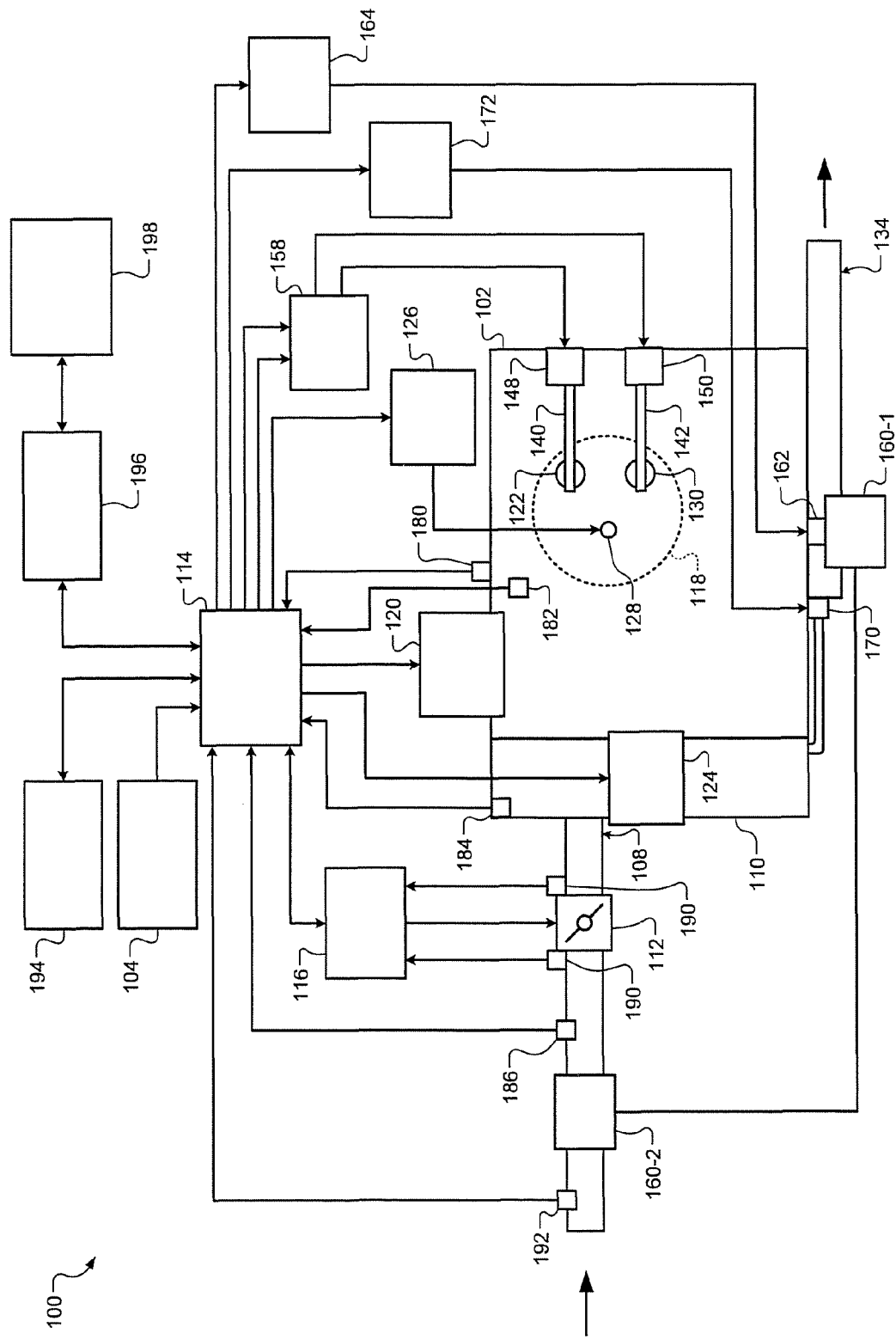
FIG. 2 is a functional block diagram of an example engine system according to one implementation of the present disclosure.

Referring now to FIG. 2, a functional block diagram of an exemplary engine system 100 is presented. The engine system 100 includes an engine 102 that combusts an air/fuel mixture to produce drive torque for a vehicle based on driver input from a driver input module 104. Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 2 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the transmission (not shown) may be a manual transmission. Additionally, for example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 2, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 3:
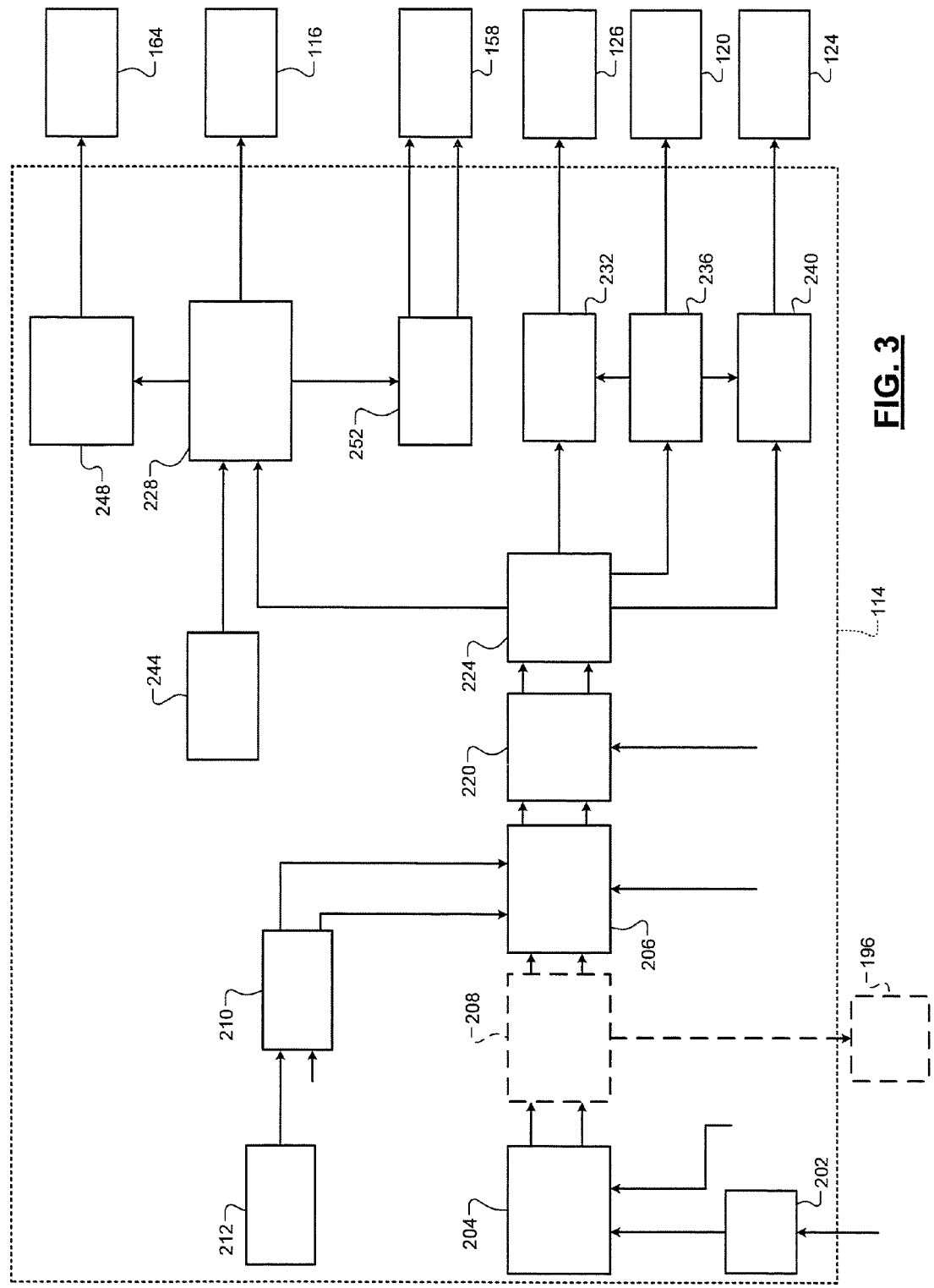
FIG. 3 is a functional block diagram of an example engine control system according to the one implementation of the present disclosure.

Referring now to FIG. 3, a functional block diagram of an exemplary engine control system is presented. An exemplary implementation of the ECM 114 includes a driver torque module 202. The driver torque module 202 may determine a driver torque request based on a driver input from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to desired torque, and may determine the driver torque request based on a selected one of the mappings.

An axle torque arbitration module 204 arbitrates between the driver torque request from the driver torque module 202 and other axle torque requests. Axle torque (torque at the wheels) may be produced by various sources including an engine and/or an electric motor. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

Axle torque requests may include a torque reduction requested by a traction control system when positive wheel slip is detected. Positive wheel slip occurs when axle torque overcomes friction between the wheels and the road surface, and the wheels begin to slip against the road surface. Axle torque requests may also include a torque increase request to counteract negative wheel slip, where a tire of the vehicle slips in the other direction with respect to the road surface because the axle torque is negative.

Axle torque requests may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules of the ECM 114 before being used to control actuators of the engine system 100.

In general terms, the immediate torque request is the amount of currently desired axle torque, while the predicted torque request is the amount of axle torque that may be needed on short notice. The ECM 114 therefore controls the engine system 100 to produce an axle torque equal to the immediate torque request. However, different combinations of actuator values may result in the same axle torque. The ECM 114 may therefore adjust the actuator values to allow a faster transition to the predicted torque request, while still maintaining the axle torque at the immediate torque request.

In various implementations, the predicted torque request may be based on the driver torque request. The immediate torque request may be less than the predicted torque request, such as when the driver torque request is causing wheel slip on an icy surface. In such a case, a traction control system (not shown) may request a reduction via the immediate torque request, and the ECM 114 reduces the torque produced by the engine system 100 to the immediate torque request. However, the ECM 114 controls the engine system 100 so that the engine system 100 can quickly resume producing the predicted torque request once the wheel slip stops.

In general terms, the difference between the immediate torque request and the higher predicted torque request can be referred to as a torque reserve. The torque reserve may represent the amount of additional torque that the engine system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request is within the range, fast engine actuators can be set to cause the axle torque to be equal to the immediate torque request. When the ECM 114 requests the predicted torque request to be output, the fast engine actuators can be controlled to vary the axle torque to the top of the range, which is the predicted torque request.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request if the fast actuators were set to appropriate values. Meanwhile, the ECM 114 may set actuator values for fast actuators to values that, given the slow actuator values, cause the engine system 100 to produce the immediate torque request instead of the predicted torque request.

The fast actuator values therefore cause the engine system 100 to produce the immediate torque request. When the ECM 114 decides to transition the axle torque from the immediate torque request to the predicted torque request, the ECM 114 changes the actuator values for one or more fast actuators to values that correspond to the predicted torque request. Because the slow actuator values have already been set based on the predicted torque request, the engine system 100 is able to produce the predicted torque request after only the delay imposed by the fast actuators. In other words, the longer delay that would otherwise result from changing axle torque using slow actuators is avoided.

For example only, when the predicted torque request is equal to the driver torque request, a torque reserve may be created when the immediate torque request is less than the driver torque request due to a temporary torque reduction request. Alternatively, a torque reserve may be created by increasing the predicted torque request above the driver torque request while maintaining the immediate torque request at the driver torque request. The resulting torque reserve can absorb sudden increases in required axle torque. For example only, sudden loads from an air conditioner or a power steering pump may be counterbalanced by increasing the immediate torque request. If the increase in immediate torque request is less than the torque reserve, the increase can be quickly produced by using fast actuators. The predicted torque request may then also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request while maintaining the values of the slow actuators. For example, to maintain a given idle speed, the immediate torque request may vary within a range. If the predicted torque request is set to a level above this range, variations in the immediate torque request that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to a calibrated value, maximum torque is produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle valve opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded (which reduces torque) based on the immediate torque request. The engine output torque will therefore be equal to the immediate torque request.

When additional torque is needed, such as when the air conditioning compressor is started, or when traction control determines wheel slip has ended, the spark timing can be set based on the predicted torque request. By the following firing event, the spark actuator module 126 may return the spark advance to a calibrated value, which allows the engine 102 to produce the full engine output torque achievable with the air flow already present. The engine output torque may therefore be quickly increased to the predicted torque request without experiencing delays from changing the throttle opening area.

When the engine 102 is a compression-ignition engine, the fuel actuator module 124 may be a fast actuator and the throttle actuator module 116 and the boost actuator module 164 may be emissions actuators. In this manner, the fuel mass may be set based on the immediate torque request, and the throttle opening area and boost may be set based on the predicted torque request. The throttle opening area may generate more air flow than necessary to satisfy the predicted torque request. In turn, the air flow generated may be more than required for complete combustion of the injected fuel such that the air/fuel ratio is usually lean and changes in air flow do not affect the engine torque output. The engine output torque will therefore be equal to the immediate torque request and may be increased or decreased by adjusting the fuel flow.

The throttle actuator module 116, the boost actuator module 164, and the EGR actuator module 172 may be controlled based on the predicted torque request to control emissions and to minimize turbo lag. The throttle actuator module 116 may create a vacuum to draw exhaust gases through the EGR valve 170 and into the intake manifold 110.

The axle torque arbitration module 204 may output the predicted torque request and the immediate torque request to a propulsion torque arbitration module 206. In various implementations, the axle torque arbitration module 204 may output the predicted and immediate torque requests to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which reduces the engine output torque when the driver depresses the clutch pedal in a manual transmission vehicle to prevent a flare (rapid rise) in engine speed.

Propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque request from the axle torque arbitration module 204 is less than a predetermined torque value.

The RPM control module 210 receives a desired RPM from an RPM trajectory module 212, and controls the predicted and immediate torque requests to reduce the difference between the desired RPM and the current RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to an actuation module 224.

For example only, a catalyst light-off process or a cold start emissions reduction process may require retarded spark advance. The reserves/loads module 220 may therefore increase the adjusted predicted torque request above the adjusted immediate torque request to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request while leaving the adjusted immediate torque request unchanged to produce the torque reserve. Then, when the A/C compressor clutch engages, the reserves/loads module 220 may increase the immediate torque request by the estimated load of the NC compressor clutch.

The actuation module 224 receives the adjusted predicted and immediate torque requests from the reserves/loads module 220. The actuation module 224 determines how the adjusted predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other actuators.

An air control module 228 may determine desired actuator values based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

The actuation module 224 may also generate a spark torque request, a cylinder shut-off torque request, and a fuel torque request. The spark torque request may be used by a spark control module 232 to determine how much to retard the spark timing (which reduces engine output torque) from a calibrated spark advance. The spark control module 232, therefore, may implement the system or method of the present disclosure.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel torque request from the actuation module 224. During normal operation of a spark-ignition engine, the fuel control module 240 may operate in an air lead mode in which the fuel control module 240 attempts to maintain a stoichiometric air/fuel ratio by controlling fuel flow based on air flow. The fuel control module 240 may determine a fuel mass that will yield stoichiometric combustion when combined with the current amount of air per cylinder. The fuel control module 240 may instruct the fuel actuator module 124 via the fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

A mode setting may determine how the actuation module 224 treats the adjusted immediate torque request. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the adjusted immediate torque request and set engine output torque based on the adjusted predicted torque request. The actuation module 224 may therefore set the spark torque request, the cylinder shut-off torque request, and the fuel torque request to the adjusted predicted torque request, which maximizes engine output torque for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 outputs the adjusted predicted torque request as the air torque request and attempts to achieve the adjusted immediate torque request by adjusting only spark advance. The actuation module 224 therefore outputs the adjusted immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved. The engine output torque will then be greater than the adjusted immediate torque request.

In the maximum range mode, the actuation module 224 may output the adjusted predicted torque request as the air torque request and the adjusted immediate torque request as the spark torque request. In addition, the actuation module 224 may decrease the cylinder shut-off torque request (thereby deactivating cylinders) when reducing spark advance alone is unable to achieve the adjusted immediate torque request.

In the auto actuation mode, the actuation module 224 may decrease the air torque request based on the adjusted immediate torque request. In various implementations, the air torque request may be reduced only so far as is necessary to allow the spark control module 232 to achieve the adjusted immediate torque request by adjusting spark advance. Therefore, in auto actuation mode, the adjusted immediate torque request is achieved while adjusting the air torque request as little as possible. In other words, the use of relatively slowly-responding throttle valve opening is minimized by reducing the quickly-responding spark advance as much as possible.

This allows the engine 102 to return to producing the adjusted predicted torque request as quickly as possible.

A torque estimation module 244 may estimate torque output of the engine 102. This estimated torque may be used by the air control module 228 to perform closed-loop control of engine air flow parameters, such as throttle area, MAP, and phaser positions. For example, a torque relationship such as $$T=f(APC,S,I,E,AF,OT,\#) \qquad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

The actual spark advance may be used to estimate the actual engine output torque. When a calibrated spark advance value is used to estimate torque, the estimated torque may be called an estimated air torque, or simply air torque. The air torque is an estimate of how much torque the engine could generate at the current air flow if spark retard was removed (i.e., spark timing was set to the calibrated spark advance value) and all cylinders were fueled.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may output a desired manifold absolute pressure (MAP) signal to a boost scheduling module 248. The boost scheduling module 248 uses the desired MAP signal to control the boost actuator module 164. The boost actuator module 164 then controls one or more turbochargers (e.g., the turbocharger including the turbine 160-1 and the compressor 160-2) and/or superchargers.

The air control module 228 may also output a desired air per cylinder (APC) signal to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#).$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to maximum brake torque (MBT) as possible. MBT refers to the maximum engine output torque that is generated for a given air flow as spark advance is increased, while using fuel having an octane rating greater than a predetermined threshold and using stoichiometric fueling. The spark advance at which this maximum torque occurs is referred to as MBT spark. The calibrated spark advance may differ slightly from MBT spark because of, for example, fuel quality (such as when lower octane fuel is used) and environmental factors. The torque at the calibrated spark advance may therefore be less than MBT.

Figure 4:
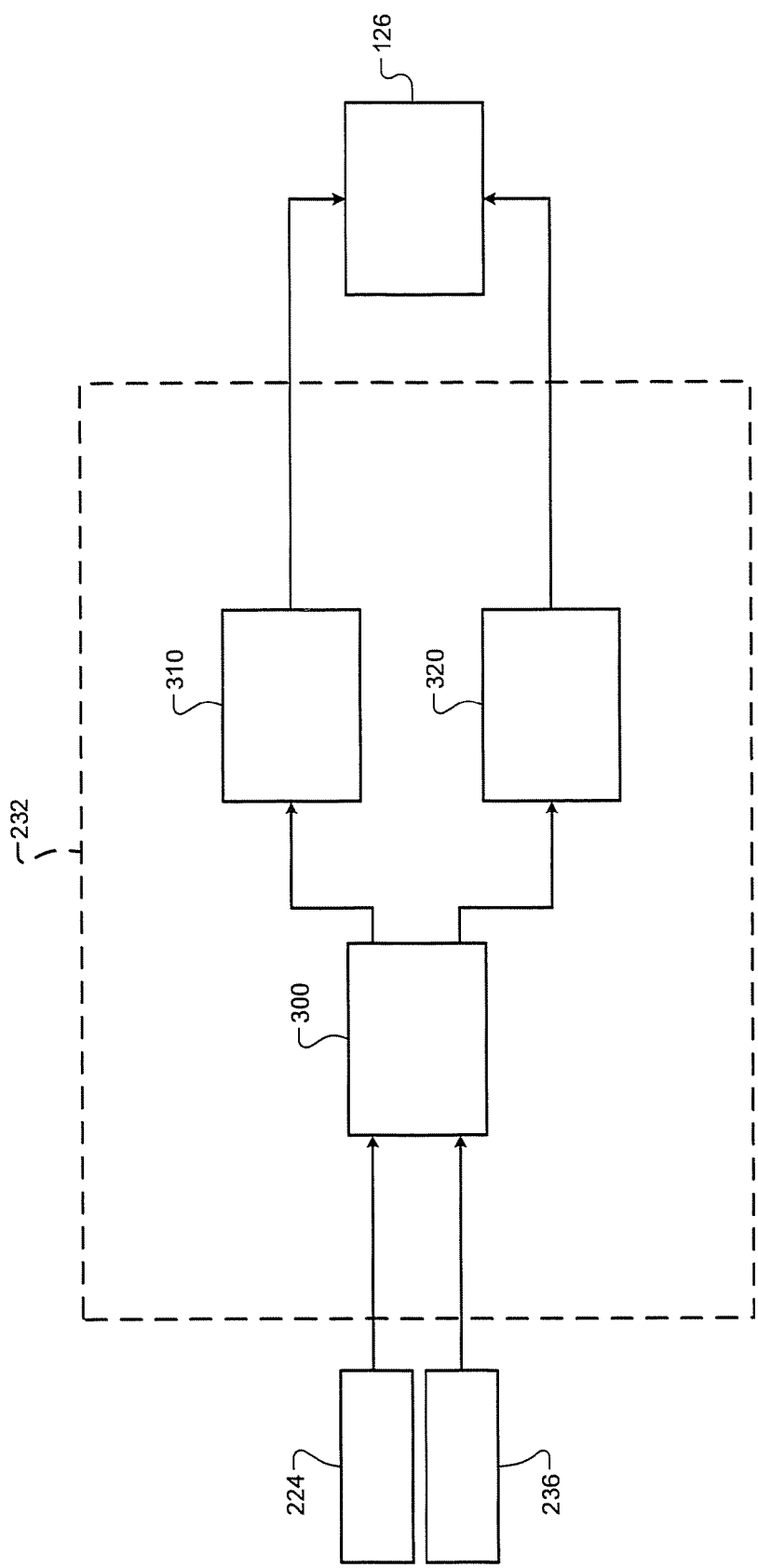
FIG. 4 is a functional block diagram of an example spark control module according to one implementation of the present disclosure.

Referring now to FIG. 4, an example of the spark control module 232 is shown. The spark control module 232 may include a torque split module 300, a first spark control module 310 and a second spark control module 320.

The torque split module 300 determines a desired torque split for both deactivating/reactivating cylinders and activate cylinders. The torque split module 300 receives a base torque request (A) from the actuation module 224. The torque split module 300 also receives statues of one or more of the cylinders 118. In some implementations, the torque split module 300 may receive a status of one of the cylinders 118 (i.e., individual cylinder torque control). In other implementations, the torque split module 300 may receive statuses for each the cylinders 118. The statuses indicate whether the cylinder is activated, whether the cylinder is transitioning (deactivating or reactivating), or whether the cylinder is deactivated. Therefore, for example only, the torque split module 300 may receive statuses indicating that half of the cylinders 118 are activated and half of the cylinders are deactivating (e.g., N=4, M=8). However, other numbers of cylinders may be deactivated and/or reactivated.

The torque split module determines a torque split ($T_S$) for both deactivating/reactivating cylinders and active cylinders based on the base torque request A and the other following parameters:

B=Minimum Torque Capacity

C=Maximum Torque Capacity

N=Total Number of Cylinders

M=Number of Deactivating/Reactivating Cylinders $T_A$=Torque Command for Active Cylinders $T_D$=Torque Command for Reactivating/Deactivating Cylinders where B and C represent minimum and maximum torque capacities at a minimum and maximum allowed spark advances for current operating conditions, respectively.

The desired torque split $T_S$ may be determined as follows:

$$T_S = (A - B) \times \frac{M}{N - M} \qquad (3)$$

or $$T_S = (C - A) \qquad (4)$$

where the desired torque split $T_S$ is the lesser value of (3) and (4). Rather, if B is too high of a value the torque split $T_S$ may be limited to a smaller value. The torque split $T_S$ may also be ramped in at a predetermined rate.

The torque split module 300 may generate first and second desired torque requests for the first and second spark control modules 310 and 320, respectively. The torque split module 300 may generate the first desired torque request as follows:

$$T_D = A - T_S \times \frac{N-M}{M}. \tag{5}$$

The torque split module 300 may generate the second desired torque request as follows:

$$T_A = A + T_S \tag{6}$$

The first spark control module 310 receives the first desired torque request $T_D$ for the M deactivating or reactivating cylinders 118. The first spark control module 310 generates a first spark timing to be used by the spark actuator module 126 in controlling spark for the M deactivating or reactivating cylinders. Specifically, the first spark control module 310 may generate the first spark timing based on the first desired torque request $T_D$. Similarly, the second spark control module 320 receives the second desired torque request $T_A$ for the (N−M) active cylinders 118. The second spark control module 320 generates a second spark timing to be used by the spark actuator module 126 in controlling spark for the (N−M) active cylinders. Specifically, the second spark control module 320 may generate the second spark timing based on the second desired torque request $T_A$.

Figure 5A:
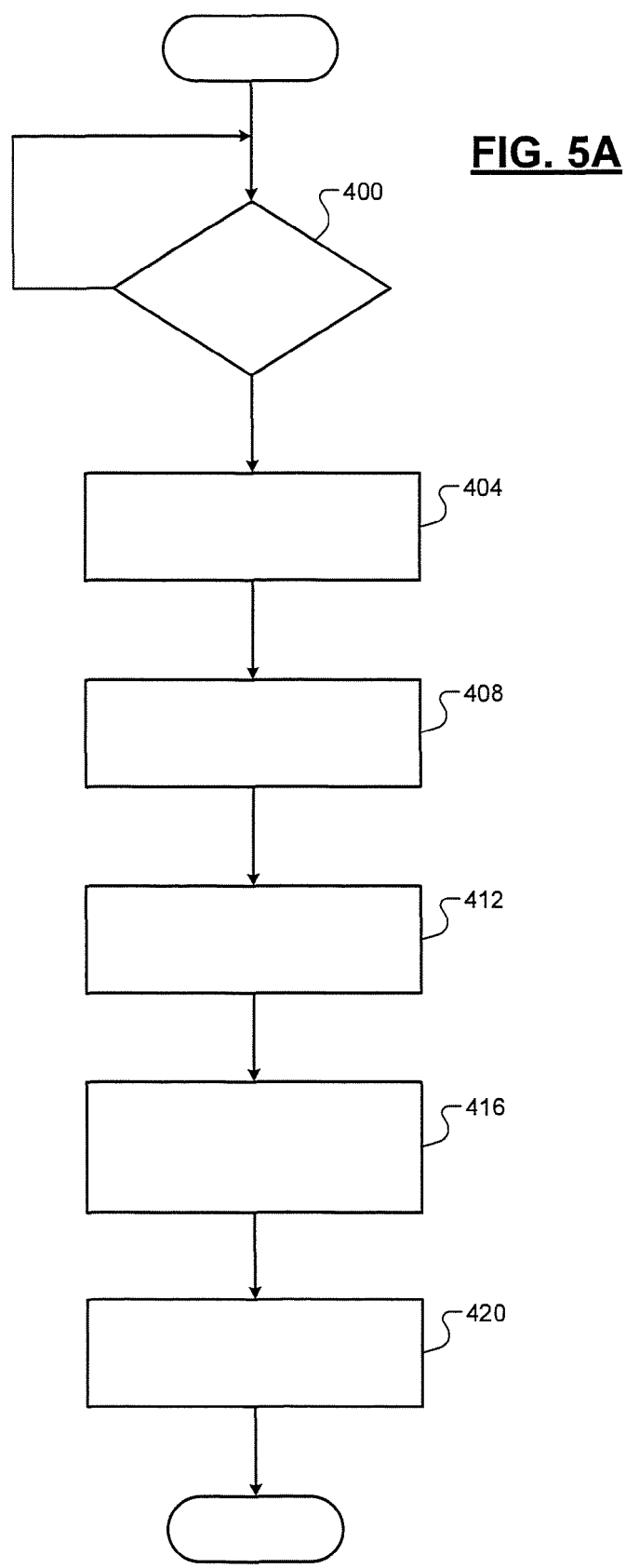
FIG. 5A is a flow diagram illustrating an example method for decreasing torque fluctuations during cylinder deactivation according to one implementation of the present disclosure.

Referring now to FIG. 5A, an example method for decreasing torque fluctuations during cylinder deactivation begins at 400. At 400, the ECM 114 may determine whether cylinder deactivation is requested. For example, cylinder deactivation may be requested when a torque request is less than a predetermined threshold. If true, control may proceed to 404. If false, control may return to 400. At 404, the ECM 114 may determine the torque split $T_S$. At 408, the ECM 114 may determine the first and second torque requests $T_D$ and $T_A$, respectively, based on the base torque request and the torque split T. At 412, the ECM 114 may determine the first and second spark timings based on the first and second torque requests $T_D$ and $T_A$, respectively. At 416, the ECM 114 may retard spark timing for the M deactivating cylinders to the first spark timing and may advance spark timing for the (N−M) active cylinders to the second spark timing. At 420, the ECM 114 may deactivate the M cylinders. Control may then end.

Figure 5B:
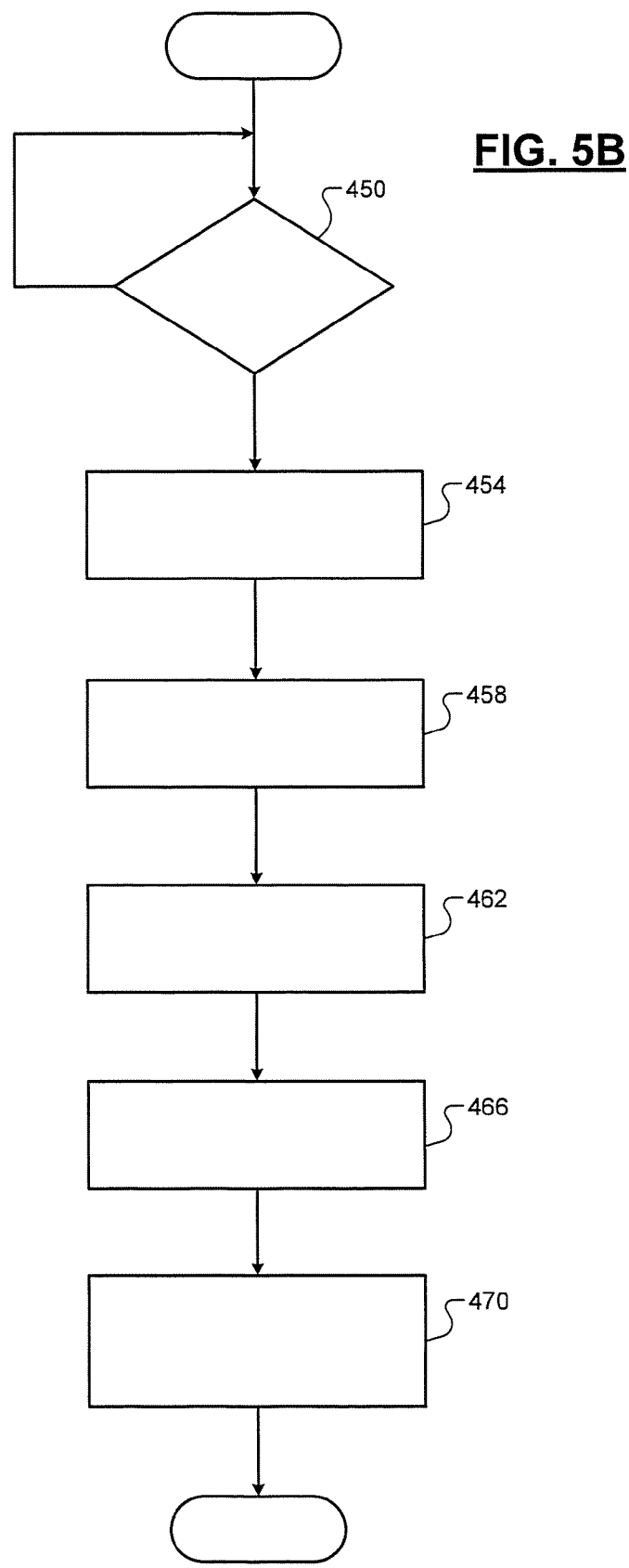
FIG. 5B is a flow diagram illustrating an example method for decreasing torque fluctuations during cylinder reactivation according to one implementation of the present disclosure.

Referring now to FIG. 5B, an example method for decreasing torque fluctuations during cylinder reactivation begins at 450. At 450, the ECM may determine whether cylinder reactivation is requested. For example, cylinder reactivation may be requested when the torque request is greater than another predetermined threshold. If true, control may proceed to 454. If false, control may return to 450. At 454, the ECM 114 may reactivate the M cylinders. At 458, the ECM 114 may determine the torque split $T_S$. At 462, the ECM 114 may determine the first and second torque requests $T_D$ and $T_A$, respectively, based on the base torque request and the torque split $T_S$. At 466, the ECM 114 may determine the first and second spark timings based on the first and second torque requests $T_D$ and $T_A$, respectively. At 470, the ECM 114 may retard spark timing for the M reactivated cylinders to the first spark timing and may advance spark timing for the (N−M) active cylinders to the second spark timing. Control may then end. In some implementations, however, the ECM 114 may implement both the example methods of FIG. 5A and the example method of FIG. 5B. In other words, the ECM 114 may control spark timing to decrease torque fluctuations during both cylinder deactivation and reactivation events.

Figure 6A:
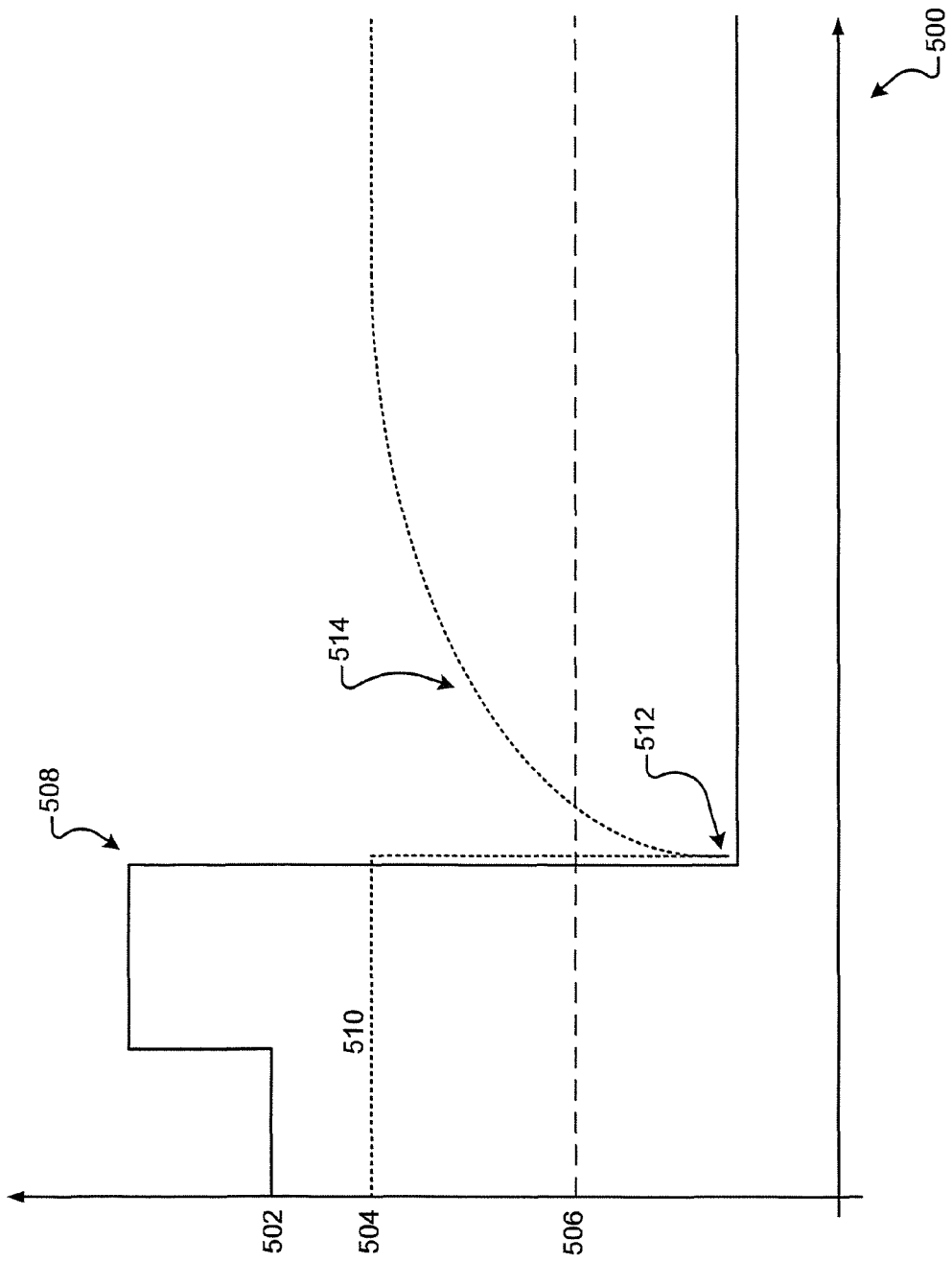
FIG. 6A is a graph illustrating simulated results of controlling spark timing to decrease torque fluctuations during cylinder deactivation according to one implementation of the present disclosure.
Figure 6B:
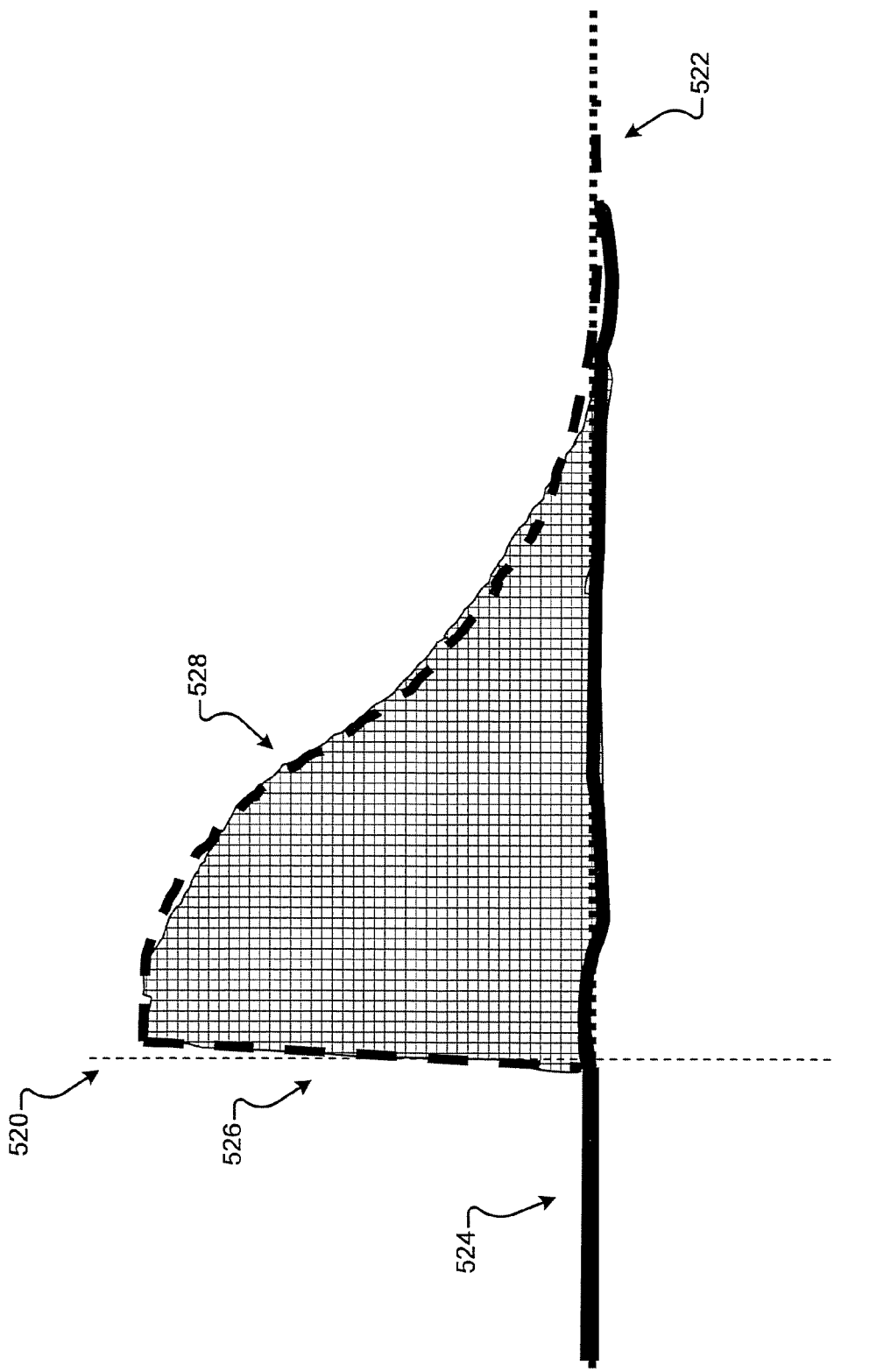
FIG. 6B is a graph illustrating simulated results of controlling spark timing to decrease torque fluctuations during cylinder reactivation according to one implementation of the present disclosure.

Referring now to FIGS. 6A-6B, simulated results of the method of FIG. 5B are illustrated. FIG. 5A includes a horizontal axis 500 representing time and a vertical axis including cylinder control 502, spark timing 504, and engine speed 506. Engine speed 506 remains constant over time. When the cylinder control 502 reactivates cylinders at 508, the spark timing 504 is retarded at 512 for a period and then advanced at 514 until the base spark timing 510 is resumed. FIG. 6B includes a vertical axis 520 representing axle torque and a horizontal axis 522 representing time. The actual torque output 524 is maintained approximately equal to the desired torque (in contrast to a torque fluctuation 528 after a reactivation event 526, similar to that shown in FIG. 1A).

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, the control system comprising:
    an engine module that determines whether M of N cylinders of the engine are to be deactivated or reactivated, where M is an integer greater than or equal to one, and where N is an integer greater than M;
    a first spark control module that, based on the engine module determining the M cylinders of the engine are to be deactivated or reactivated, retards spark timing for the M cylinders of the engine to a first spark timing during a period before the deactivating or after the reactivating of the M cylinders of the engine; and
    a second spark control module that, based on the engine module determining the M cylinders of the engine are to be deactivated or reactivated, advances spark timing for N−M active cylinders of the engine to a second desired spark timing during the period before the deactivating or after the reactivating of the M cylinders of the engine, wherein the second spark timing is more advanced than the first spark timing.

2. The control system of claim 1, further comprising a torque split module that determines, based on a base torque request, a torque split value for the M cylinders of the engine and the N−M active cylinders of the engine.

3. The control system of claim 2, wherein:
    the torque split module determines the torque split value based on a plurality of operating parameters; and
    the plurality of operating parameters include minimum and maximum torque capacities at minimum and maximum spark advances allowed at current operating conditions, respectively.

4. The control system of claim 1, further comprising a torque split module that determines, based on a base torque request, a minimum torque capacity, and a maximum torque capacity, a torque split value for the M cylinders of the engine and the N−M active cylinders of the engine, wherein the torque split value is a lesser of:
    (1) a product of (i) a difference between the base torque request and the minimum torque capacity and (ii) a quotient of M and N−M; and
    (2) a difference between the maximum torque capacity and the base torque request.

5. The control system of claim 2, wherein the torque split module determines a first torque request for the M cylinders of the engine based on a difference between the base torque request and a product of (i) the torque split value and (ii) a quotient of N−M and M.

6. The control system of claim 5, wherein the first spark control module determines the first spark timing based on the first torque request.

7. The control system of claim 4, wherein the torque split module determines a second torque request for the N−M active cylinders of the engine based on a sum of the base torque request and the torque split value.

8. The control system of claim 7, wherein the second spark control module determines the second spark timing based on the second torque request.

9. The control system of claim 1, wherein N equals a total number of cylinders in the engine, and wherein M equals one half of N.

10. The control system of claim 1, wherein the engine is coupled to a manual transmission.

11. A method for controlling an engine, the method comprising:
   determining whether M of N cylinders of the engine are to be deactivated or reactivated, where M is an integer greater than or equal to one, and where N is an integer greater than M;
   based on determining the M cylinders of the engine are to be deactivated or reactivated, retarding spark timing for the M cylinders of the engine to a first spark timing during a period before the deactivating or after the reactivating of the M cylinders of the engine; and
   based on determining the M cylinders of the engine are to be deactivated or reactivated, advancing spark timing for N−M active cylinders of the engine to a second desired spark timing during the period before the deactivating or after the reactivating of the M cylinders of the engine, wherein the second spark timing is more advanced than the first spark timing.

12. The method of claim 11, further comprising determining a torque split value for the M cylinders of the engine and the N−M active cylinders of the engine based on a base torque request.

13. The method of claim 12, wherein:
   the torque split value is determined based on a plurality of operating parameters; and
   the plurality of operating parameters include minimum and maximum torque capacities at minimum and maximum spark advances allowed at current operating conditions, respectively.

14. The method of claim 11, further comprising determining a torque split value for the M cylinders of the engine and the N−M active cylinders of the engine based on a base torque request, a minimum torque capacity, and a maximum torque capacity, wherein the torque split value is a lesser of:
   (1) a product of (i) a difference between the base torque request and the minimum torque capacity and (ii) a quotient of M and N−M; and
   (2) a difference between the maximum torque capacity and the base torque request.

15. The method of claim 12, further comprising determining a first torque request for the M cylinders of the engine based on a difference between the base torque request and a product of (i) the torque split and (ii) a quotient of N−M and M.

16. The method of claim 15, further comprising determining the first spark timing based on the first torque request.

17. The method of claim 14, further comprising determining a second torque request for the N−M active cylinders of the engine based on a sum of the base torque request and the torque split value.

18. The method of claim 17, further comprising determining the second spark timing based on the second torque request.

19. The method of claim 11, wherein N equals a total number of cylinders in the engine, and wherein M equals one half of N.

20. The method of claim 11, wherein the engine is coupled to a manual transmission.

* * * * *